United States Patent Office

3,337,596
Patented Aug. 22, 1967

3,337,596
SYNTHESIS OF MIXED GLYCERIDES
James E. Thompson, Colerain Township, Hamilton County, Ohio, assignor to The Procter & Gamble Company, Cincinnati, Ohio, a corporation of Ohio
No Drawing. Filed Feb. 18, 1965, Ser. No. 433,772
7 Claims. (Cl. 260—410.7)

This invention relates to a process for synthesizing mixed triglycerides, that is, triglycerides having at least two different ester groups. More particularly, this invention relates to a process for esterifying partial glycerol esters without rearrangement of ester groups either by intermolecular or intramolecular exchange. The term "partial glycerol ester" is used herein to denote either a mono- or a diglyceride.

In general, this process provides mixed triglycerides with specific ester groups at specific glycerol hydroxyl sites. Thus, this process is especially useful in providing substantially pure specific triglycerides.

With most esterification procedures, the synthesis of such substantially pure specific triglycerides is impossible since substantial ester group rearrangement occurs during esterification of specific partial glycerol esters, the synthesis of which is known in the prior art. For example, acylation of 1,3-diglyceride with oleic acid and a conventional esterification catalyst provides a mixture of triglycerides and only a minor proportion of triglycerides having an oleoyl group at the 2-position.

One known method for specifically esterifying partial glycerol esters comprises reacting a partial glycerol ester with a fatty acid chloride, such as for example oleoyl chloride. The use of fatty acid chlorides for specific esterification has many undesirable aspects, however. For instance, these acid chlorides are very corrosive and their use involves handling problems. Besides, hydrochloric acid, a by-product of the reaction of an acid chloride with a hydroxyl group, is disposed of with difficulty.

Another method for specifically esterifying partial glycerol esters is described in copending application of James B. Martin and Robert A. Volpenhein, Ser. No. 405,408, filed Oct. 21, 1964. This method comprises reacting a partial glycerol ester with a fatty acid anhydride. The following equation represents a typical example of such a reaction.

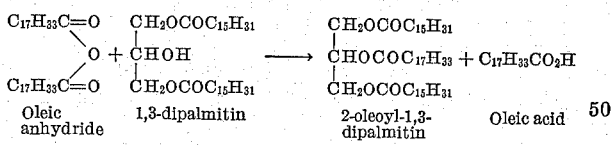

| Oleic anhydride | 1,3-dipalmitin | 2-oleoyl-1,3-dipalmitin | Oleic acid |

As the above equation shows, ordinarily in this reaction only one acid radical of each reacting anhydride molecule provides an ester group for the mixed-triglyceride reaction product; the other acid radical of the anhydride molecule combines with a hydrogen atom to form the corresponding acid as a by-product. The mixed-triglyceride reaction product is separated from the fatty acid by-product with difficulty.

It is therefore an object of this invention to provide a novel process for synthesizing specific mixed triglycerides.

It is a further object of this invention to provide a process for synthesizing specific mixed triglycerides with substantially no rearrangement of ester groups either by intermolecular or intramolecular exchange.

It is a further object of this invention to provide a process for synthesizing specific mixed triglycerides without using corrosive acid chlorides.

Another object of this invention is to provide a process for synthesizing specific mixed triglycerides without producing a hydrochloric acid by-product.

Still another object of this invention is to provide a process for synthesizing mixed triglycerides wherein all of the fatty acid radicals of the esterifying agent which reacts are utilized to provide mixed triglyceride.

These and other objects will be apparent from the description of the invention which follows.

According to this invention, it has been found that mixed triglycerides with specific ester groups at specific hydroxyl sites can be prepared by esterifying certain partial glycerol esters with a molar excess (as defined hereinafter) of certain unsymmetrical acid anhydrides in the presence of a perchloric acid catalyst.

The partial glycerol esters to be esterified within the scope of this invention are 1- and 2-monoglycerides and 1,2- and 1,3-diglycerides. They contain ester groups derived from monocarboxylic acids containing 8 to 22 carbon atoms. These ester groups include, for example, those derived from caprylic, capric, lauric, myristic, palmitoleic, palmitic, stearic, oleic, linoleic, linolenic, arachidic and behenic acids.

The monoglyceride ester groups can be saturated or unsaturated. The diglycerides include disaturated, monoacid diglycerides, e.g., distearin; disaturated, diacid diglycerides, e.g., 1-palmitoyl-3-stearoyl glycerol; diunsaturated, monoacid diglycerides, e.g., diolein; diunsaturated diacid diglycerides, e.g., 1-oleoyl-3-palmitoleoyl glycerol; and monounsaturated, monosaturated, diacid diglycerides, e.g., 1-palmitoyl-3-palmitoleoyl glycerol. The terms "diacid" and "monoacid" are used herein to denote diglycerides having two different ester groups and one kind of ester group respectively.

The unsymmetrical acid anhydrides for use in esterifying the above partial glycerol esters have the following structural formula:

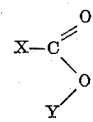

wherein X is an organic radical selected from the group consisting of alkyl and alkenyl, containing 7 to 21 carbon atoms, and Y is an organic acid radical selected from the group consisting of (1) benzoyl,
(2) p-nitrobenzoyl, and
(3) phosphoryl radicals having the structural formula

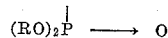

wherein R is a radical selected from the group consisting of alkyls containing 1 to 5 carbon atoms and phenyl.

The term "alkyl" is used herein to include only saturated carbon chains. The term "alkenyl" is used herein to include carbon chains containing one or more double bonds.

Unsymmetrical acid anhydrides for use as esterifying agents include, for example, caprylic-benzoic anhydride, lauric-benzoic anhydride, oleic-benzoic anhydride, arachidic-benzoic anhydride, caprylic-p-nitrobenzoic anhydride, capric-p-nitrobenzoic anhydride, myristic-p-nitrobenzoic anhydride, stearic-p-nitrobenzoic anhydride, oleic-p-nitrobenzoic anhydride, linolenic-p-nitrobenzoic anhydride and behenic-p-nitrobenzoic anhydride. Other unsymmetrical acid anhydrides include, for example, dimethyl capryloyl phosphate, methyl ethyl behenoyl phosphate, diethyl oleoyl phosphate, methyl butyl stearoyl phosphate, methyl pentyl palmitoyl phosphate, methyl phenyl stearoyl phosphate and diphenyl oleoyl phosphate.

As previously explained, the above partial glycerol esters are reacted with a molar excess of the above unsymmetrical acid anhydrides in the presence of a perchloric acid catalyst. This molar excess is defined as more than at least one mole of unsymmetrical acid anhydride for each mole of available partial glycerol ester hydroxyl groups. The molar excess of unsymmetrical acid anhydride is an essential feature herein and is necessary for reaction without ester group rearrangement. Preferably, at least a 10% molar excess is used and optimally at least a 20% to 50% molar excess. The maximum amount of excess unsymmetrical acid anhydride is not critical. For example, a molar excess of ten to twenty times can be used, especially if the excess anhydride is used as the reaction solvent as described hereinafter.

The perchloric acid catalyst is another essential feature herein and is necessary for reaction without ester group rearrangement. The catalyst is used as a water solution containing at least about 20% by weight and not more than about 70% by weight perchloric acid. If the water solution contains less than about 20% by weight perchloric acid the catalyst will not promote the esterification reaction; this is true no matter how much less-than-about 20% perchloric acid solution is added to an initial partial ester anhydride mixture. The not-more-than-about 70% by weight limitation is critical for two reasons: (1) because a perchloric acid-water solution forms a maximum boiling point mixture containing 71.6% acid; and (2) because more concentrated solutions are dangerously explosive if allowed to come into contact with oxidizable materials. To promote the esterification reaction, the perchloric acid to anhydride molar ratio must exceed about 0.01 to 1. A maximum limit of 0.50 to 1 for this molar ratio is desirable because of the explosive nature of perchloric acid.

The above perchloric acid catalyzed esterification reaction takes place over a wide range of temperatures and in the presence of a wide variety of solvents without ester group rearrangement.

Generally, reaction temperatures range from $-80°$ C. to $110°$ C. with $0°$ C. to $50°$ C. preferred because of the explosive nature of perchloric acid, especially above $50°$ C. The reaction can in most cases be carried out at room temperature. It is noted that substantial reaction normally occurs at room temperature in a time period ranging from five minutes to five hours. Thus, the reaction of this invention is very rapid when compared with esterification with acid chlorides which at room temperature normally takes from 10 to 24 hours for substantial reaction completeness.

In general, the solvent, if any, can be any organic liquid medium which will form a phase sufficiently uniform so as to bring the reactants into contact. Preferably, if it is a liquid, a molar excess of unsymmetrical acid anhydride is used as the solvent. Other useful solvents include chlorinated hydrocarbons such as chloroform and carbon tetrachloride, aromatic hydrocarbons such as benzene and aliphatic esters such as ethyl acetate. Still other useful solvents include aromatic heterocyclic bases such as pyridine, tertiary amides such as dimethylformamide and dimethylacetamide, and heterocyclic oxides such as tetrahydrofuran.

The following equations represent typical examples of the above described reaction of this invention:

(1) Wherein Y in the unsymmetrical anhydride structure above is a benzoyl radical

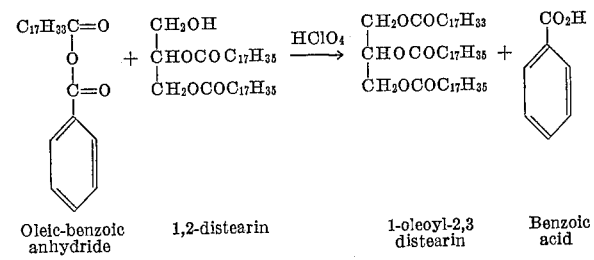

Oleic-benzoic anhydride  1,2-distearin  1-oleoyl-2,3 distearin  Benzoic acid (2) Wherein Y in the unsymmetrical anhydride structure above is a p-nitrobenzoyl radical

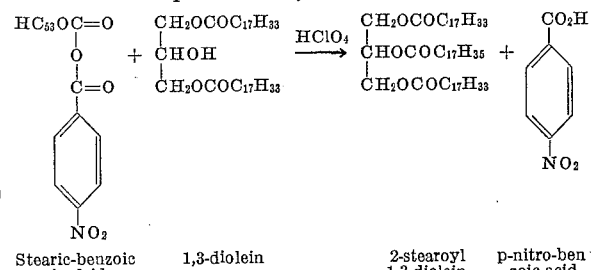

Stearic-benzoic anhydride  1,3-diolein  2-stearoyl 1,3-diolein  p-nitro-benzoic acid (3) Wherein Y in the unsymmetrical anhydride structure above is a phosphoryl radical

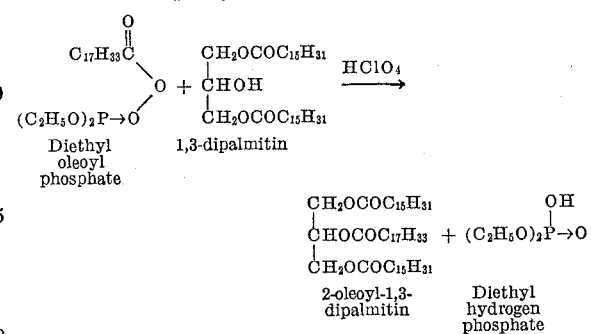

Diethyl oleoyl phosphate  1,3-dipalmitin 2-oleoyl-1,3-dipalmitin  Diethyl hydrogen phosphate Not shown in each of the above equations is the excess anhydride which is present in the reaction mixture.

Depending upon the particular unsymmetrical anhydride used in the above described reaction of this invention, the reaction by-products can be water soluble and therefore easily separated from the triglyceride reaction product. For example, the by-products in the above typical example equations, namely, benzoic acid, p-nitrobenzoic acid and diethyl hydrogen phosphate, are all water soluble and easily separable.

Turning now to a general discussion of the reactants for use in the present process, most of such reactants are not readily obtainable commercially at present. As far as the partial glycerol esters are concerned, the preparation of specific mono- and diglycerides is described in Baur and Lange, Journal of the American Chemical Society, 1951, vol. 73, page 3926, and in the Mattson and Volpenhein, Journal of Lipid Research, July 1962, vol. 3, No. 3, pages 281–296.

The unsymmetrical anhydrides having the above structural formula wherein Y is a benzoyl or p-nitrobenzoyl radical are conveniently prepared by reacting in a liquid state the triethylammonium salt of one acid with the acid chloride of another acid. The resulting triethylamine hydrochloride is filtered from the anhydride and the anhydride is washed with water to remove remaining undesirable by-products. Other carboxylates, such as sodium or pyridinium salts, can be used in the preparation of the anhydride in place of the triethylammonium salts.

The unsymmetrical anhydrides having the above structural formula wherein Y is a phosphoryl radical are conveniently prepared by reacting a trialkyl phosphite, such as triethylphosphite, with a dialkyl halomalonate, such as dimethyl bromomalonate, for example at $0°$ C. in ether for 30 minutes and then reacting the resulting reaction mixture at room temperature for about 16 hours together with a fatty acid, such as oleic acid, to provide desired anhydride, such as diethyl oleoyl phosphate, and dialkyl malonate, such as dimethyl malonate. This method is described in Cramer and Gartner, Chem. Ber., 91, 704 (1958).

The methods set forth above for the preparation of various reactants which are useful herein are given only by way of example and do not constitute any part of the present invention.

The following examples are illustrative of the present invention and are not to be construed in any way as limiting the scope of the invention. A molar excess (as previously defined) of anhydride over partial glycerol ester is used in each of these examples. This molar excess is necessary to obtain substantially no ester group rearrangement during esterification. Unless otherwise specified, all percentages in the following examples are by weight.

EXAMPLE I

*Esterification of 1,3-distearin with oleic-benzoic anhydride*

Oleic-benzoic anhydride is prepared by reacting 42.3 g. (0.15 mole) of oleic acid (99+% pure), 15.1 g. (0.15 mole) of triethylamine and 21.1 g. (0.15 mole) of benzoyl chloride in 1 liter of anhydrous ethyl ether for 16 hours at room temperature. The precipitate of triethylamine hydrochloride is removed by filtration, the filtrate is washed three times with water and is finally dried with anhydrous magnesium sulfate. Evaporation of the ether under vacuum leaves the anhydride which is then reacted directly with the diglyceride.

The above anhydride and 62.5 g. (0.10 mole) of 1,3-distearin (commercial product) are reacted in 300 ml. of water-washed, distilled and dried chloroform in the presence of 0.26 ml. of 70% perchloric acid catalyst (0.020 mole perchloric acid per mol of anhydride). The reactants are mixed together at room temperature for three hours.

In order to purify the desired product, the resulting reaction mixture is dissolved in 500 ml. of ether together with 100 ml. of water. The ether phase is water-washed three times, dried and evaporated under reduced pressure. The residue is crystallized twice from 400 ml. of acetone at −7° C. and the crystals dried to provide 80.0 grams of substantially pure product.

The product has an acid value of 0.1 and a hydroxyl value of 0.5. These analytical data show that substantially all the product is triglyceride. Since benzoic acid esters absorb ultraviolet light, the amount of benzoyldistearin in the product is determined by ultraviolet spectroscopy. The triglyceride is found to contain 2.3% benzoyldistearin. Thus the product is substantially all oleoyldistearin. The 2-position fatty acids are isolated by the pancreatic enzyme procedure described in Mattson and Volpenhein, Journal of Lipid Research, January 1961, vol. 2, No. 1, pages 58–64, and the triglyceride is found to contain 90% by weight oleic acid at the two position. Thus, substantially all of the above triglyceride is 2-oleoyl-1,3-distearin; therefore, substantially no ester group rearrangement occurs during the above esterification reaction.

EXAMPLE II

*Esterification of 1,3-distearin with oleic-p-nitrobenzoic anhydride*

Oleic-p-nitrobenzoic anhydride is prepared by reacting a solution of 4.2 g. (0.015 mole) of oleic acid (99+% pure) and 1.5 g. (0.015 mole) of triethylamine in 100 ml. hexane with 2.9 g. (0.015 mole) of p-nitrobenzoyl chloride predissolved in 400 ml. of hexane. The reactants are mixed together at room temperature for 16 hours. The precipitate of triethylamine hydrochloride is removed by filtration, the filtrate is washed three times with water and is finally dried with anhydrous magnesium sulfate. Evaporation of the solvent under vacuum leaves the anhydride which is then reacted directly with the diglyceride.

The above anhydride and 7.8 g. (0.012 mole) of 1,3-distearin (commercial product) are reacted in 150 ml. of water-washed, distilled and dried chloroform in the presence of 0.026 ml. of 70% perchloric acid catalyst (0.020 mole perchloric acid per mole anhydride). The reactants are mixed together at room temperature for three hours.

In order to purify the desired product, the resulting reaction mixture is dissolved in 250 ml. of ethyl ether together with 100 ml. of water. The ether phase is water-washed three times, dried and evaporated under reduced pressure. The residue is crystallized twice from 100 ml. of acetone at −7° C. and the crystals dried to provide 10.7 grams of substantially pure product.

The product has an acid value of less than 0.1 and a hydroxyl value of 0. These analytical data show that substantially all of the product is triglyceride. Since p-nitrobenzoic acid esters absorb ultraviolet light, the amount of p-nitrobenzoyldistearin in the product is determined by ultraviolet spectroscopy. The triglyceride is found to contain 0.22% of p-nitrobenzoyldistearin. Thus, the product is substantially all oleoyldistearin. The 2-position fatty acids are isolated by the pancreatic enzyme procedure of Example I and the triglyceride is found to contain 95% by weight oleic acid at the 2-position. Thus, substantially all of the above triglyceride is 2-oleoyl-1,3-distearin; therefore, substantially no existing ester group rearrangement occurs during the above esterification reaction.

EXAMPLE III

*Esterification of 1,3-dipalmitin with diethyl oleoyl phosphate*

Diethyl oleoyl phosphate is prepared by the method of Cramer and Gartner, Chem. Ber. 91, 704 (1958) by reacting 44.4 g. (0.15 mole) of distilled 2-carbethoxy-1-ethoxyvinyl diethyl phosphate and 42.3 g. (0.15 mole) of oleic acid (99+% pure). The reactants are stirred at room temperature in a round-bottomed flask under nitrogen until the strong vinyl group infrared absorption of the enol phosphate (1647 cm.$^{-1}$) disappears.

The diethyl oleoyl phosphate and 56.9 g. (0.10 mole) of 1,3-dipalmitin (made as described in Example 2 of Lange and Baur U.S. Patent 2,626,952) are reacted in 500 ml. of alcohol-free chloroform in the presence of 0.26 ml. of 70% perchloric acid catalyst (0.020 mole perchloric acid per mol of phosphate, the unsymmetrical anhydride used herein). The reactants are stirred at room temperature for four hours under argon.

In order to purify the desired product, the resulting reaction mixture is dissolved in 500 ml. ethyl ether together with 500 ml. of water. The ether phase is water-washed three times, dried and evaporated under reduced pressure. The residue is crystallized twice from 1000 ml. of acetone at −7° C. and the crystals dried to provide 77.8 grams of substantially pure product.

The product has an acid value of 3.5 and a hydroxyl value of 0. These analytical data show that 98.2% of the product is oleoyldipalmitin. The 2-position fatty acids are isolated by the pancreatic enzyme procedure of Example I and the triglyceride is found to contain 87% by weight oleic acid at the 2-position. Thus substantially all of the above triglyceride is 2-oleoyl-1,3-dipalmitin; therefore, substantially no existing ester group rearrangement occurs during the above esterification reaction.

Similar results are obtainable if molar equivalents of other phosphates are substituted for the diethyl oleoyl phosphate in this example. For instance, substantially no ester group rearrangement occurs if methyl pentyl oleoyl phosphate or methyl phenyl oleoyl phosphate is substituted for the diethyl oleoyl phosphate above.

Also, similar results are obtainable in the above examples if diacid diglycerides are substituted for the 1,3-distearin and 1,3-dipalmitin above or if these diacid diglycerides are reacted with unsymmetrical anhydrides of this invention having either saturated or unsaturated fatty acid radicals. For instance, substantially no ester group rearrangement occurs if 1-palmitoyl-3-stearoyl glycerol, 1-gadoleoyl-3-palmitoleoyl glycerol or 1-stearoyl-3-gadoleoyl glycerol is esterified with the anhydrides of the above examples or with stearic-benzoic anhydride, capric-benzoic anhydride, linolenic-benzoic anhydride, behenicp-nitrobenzoic anhydride, palmitic-p-nitrobenzoic anhydride, dimethyl stearoyl phosphate, or dibutyl palmitoleoyl phosphate.

Similar results are olso obtainable in the above examples if the molar quantities of diglycerides in these examples are replaced with one-half of these molar quantities of monoglyceride, either saturated or unsaturated. For example, the 1,3-distearin of Example I can be replaced with 0.05 mole of 1-monostearin to provide substantially pure 1-stearolyl-2,3-diolein as a reaction product.

The foregoing description has been presented describing certain operable and preferred embodiments of this invention. Other variations will be apparent to those skilled in the art.

What is claimed is:

1. A process for synthesizing specific mixed triglycerides from partial glycerol esters in such manner that substantially no ester group rearrangement occurs, said process comprising reacting a partial glycerol ester which is derived from a monocarboxylic acid containing 8 to 22 carbon atoms, with a molar excess of an unsymmetrical acid anhydride having the structural formula:

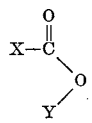

wherein X is an organic radical selected from the group consisting of alkyl and alkenyl, containing 7 to 21 carbon atoms, and Y is an organic acid radical selected from the group consisting of (1) benzoyl,
(2) p-nitrobenzoyl, and
(3) phosphoryl radicals having the structural formula

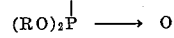

wherein R is a radical selected from the group consisting of saturated alkyls containing 1 to 5 carbon atoms and phenyl;

said reaction being carried out in the presence of a perchloric acid catalyst, the molar ratio of said catalyst to said anhydride exceeding about 0.01 to 1.

2. The process of claim 1 wherein the partial glycerol ester is a monoglyceride.

3. The process of claim 1 wherein the partial glycerol ester is a diglyceride.

4. The process of claim 1 wherein the unsymmetrical acid anhydride is oleic-benzoic anhydride.

5. The process of claim 1 wherein the unsymmertical acid anhydride is oleic-p-nitrobenzoic anhydride.

6. The process of claim 1 wherein the unsymmetrical acid anhydride is diethyl oleoyl phosphate.

7. The process of claim 1 wherein the perchloric acid catalyst is present as an aqueous solution containing from about 20% to about 70%, by weight, of perchloric acid.

References Cited

UNITED STATES PATENTS

| 2,722,538 | 11/1955 | Jackson | 260—461 |
| 2,807,612 | 9/1957 | Lamborn | 260—227 |

ALEX MAZEL, *Primary Examiner.*

HENRY R. JILES, *Examiner.*